United States Patent
Kim et al.

(10) Patent No.: US 8,037,340 B2
(45) Date of Patent: Oct. 11, 2011

(54) APPARATUS AND METHOD FOR MICRO PERFORMANCE TUNING OF A CLOCKED DIGITAL SYSTEM

(75) Inventors: Daeik Kim, White Plains, NY (US); Jonghae Kim, Fishkill, NY (US); Moon Ju Kim, Wappingers Falls, NY (US); James Randal Moulic, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 11/946,466

(22) Filed: Nov. 28, 2007

(65) Prior Publication Data

US 2009/0138748 A1   May 28, 2009

(51) Int. Cl.
*G06F 1/04* (2006.01)
(52) U.S. Cl. .................................................. 713/503
(58) Field of Classification Search .............. 713/503, 713/500, 300
See application file for complete search history.

(56) References Cited

U.S. PATENT DOCUMENTS

| | | | |
|---|---|---|---|
| 5,140,202 A * | 8/1992 | Langford et al. | 327/261 |
| 5,721,887 A * | 2/1998 | Nakajima | 713/500 |
| 6,396,137 B1 | 5/2002 | Klughart | |
| 6,611,435 B2 * | 8/2003 | Kumar et al. | 361/807 |
| 6,891,399 B2 * | 5/2005 | Ngo et al. | 326/93 |
| 6,950,950 B2 * | 9/2005 | Sawyers et al. | 713/300 |
| 7,076,679 B2 * | 7/2006 | Fischer et al. | 713/501 |
| 7,243,006 B2 | 7/2007 | Richards | |
| 7,581,128 B2 * | 8/2009 | Yamada et al. | 713/323 |
| 7,598,786 B2 * | 10/2009 | Cheng | 327/175 |
| 7,685,458 B2 * | 3/2010 | Yamaoka | 713/501 |
| 2006/0020838 A1 | 1/2006 | Tschanz et al. | |

OTHER PUBLICATIONS

Kim, D. et al., U.S. Appl. No. 11/946,522, Apparatus, Method and Program Product for Adaptive Real-Time Power and Performance Optimization of Multi-Core Processors, filed Nov. 28, 2007.
Choongyeun, C. et al., U.S. Appl. No. 11/946550, Apparatus and Method for Recycling and Reusing Charge in an Electronic Circuit, filed Nov. 28, 2007.
Hazlewood, K. et al., Eliminating Voltage Emergencies via Microarchitectural Voltage control Feedback and Dynamic Optimization, ISLPED '04, Aug. 9-11, 2004, pp. 326-331,Newport Beach, CA, USA.
Venkatachalam, V. et al., Power Reduction Techniques for Microprocessor Systems, ACM Computing Surveys, vol. 37. No. 3, Sep. 2005, pp. 195-237.

* cited by examiner

*Primary Examiner* — Thomas Lee
*Assistant Examiner* — Eric Chang
(74) *Attorney, Agent, or Firm* — William E. Schiesser; Ronald A. D'Alessandro; Keohane & D'Alessandro PLLC (57) ABSTRACT

An apparatus and method for micro-tuning an effective clock frequency of a core in a microprocessor. The apparatus includes a microprocessor having at least one core with logic configured to transition between states, a clock signal coupled to the microprocessor, the clock signal having a predetermined clock frequency based on a worst-case clock frequency and a predetermined clock period. The apparatus further including at least one voltage drop sensor coupled to the core, the sensor being configured to generate an output signal for detecting a voltage drop in the core and to determine whether or not the output signal is detected within the clock period and, if the output signal is not detected, the sensor dynamically adjusts the clock period of the clock signal provided to the core to allow more time to complete state transitions, such that, dynamically adjusting the clock period effectively changes an effective core clock frequency.

23 Claims, 9 Drawing Sheets

APPARATUS AND METHOD FOR MICRO PERFORMANCE TUNING OF A CLOCKED DIGITAL SYSTEM

FIELD OF THE INVENTION

The present invention relates to an apparatus and method for micro performance tuning of a clocked digital system. More particularly, the present invention relates to an apparatus and method for micro-managing the clock distribution to the clocked digital system for optimizing system performance and an effective operating frequency of the digital system.

BACKGROUND OF THE INVENTION

A clocked digital system has a regular clock rate or frequency for synchronous data handling. The system's maximum operating frequency is determined by the worst case delay in the system. The worst case delay depends on the synchronous switching of the digital logic in the system. The switching draws a lot of current from the power supply, such that, the system's local power supply voltage and ground voltage are bounced due to limited on-chip decoupling capacitance and non-zero power supply line resistance and inductance. This voltage bouncing results in insufficient current being provided for the system leading to an increased delay in state transition time for the logic, a lower clock rate and a decrease in system performance. As such, there is a need for a cost effective and efficient way to improve performance of a clocked digital system.

SUMMARY OF THE INVENTION

In a first aspect of the invention, there is provided an apparatus for micro-tuning an effective clock frequency of a core in a microprocessor. The apparatus includes a microprocessor including at least one core having logic that is configured to transition between states, a clock signal coupled to the microprocessor, the clock signal having a predetermined clock frequency based on a worst-case clock frequency and a predetermined clock period, the predetermined clock period being an inverse of the predetermined clock frequency. The apparatus further includes at least one sensor coupled to the core in the microprocessor, the sensor being configured to generate a sensor output signal for detecting at least one level of voltage drop in the core when the logic within the core is transitioning between states, the sensor being configured to determine whether or not the sensor output signal generated is detected within the predetermined clock period, such that, if the sensor output signal generated is not detected within the predetermined clock period, the sensor dynamically adjusts the predetermined clock period of the clock signal provided to allow more time to the core to complete the transitioning between states and where dynamically adjusting the predetermined clock period effectively changes an effective clock frequency of the core in the microprocessor. In an embodiment, the sensor dynamically adjusts the clock period within an order of one clock cycle.

In another aspect of the invention, there is provided an apparatus for improving performance of a synchronous digital system. The apparatus includes a synchronous digital system including an integrated circuit having a plurality of cores, a respective power supply configured to supply a respective voltage to a respective core of the plurality of cores of the integrated circuit, a clock signal source having a clock signal input coupled to the synchronous digital system and a clock signal output coupled to the integrated circuit, the clock signal source having a predetermined clock frequency and a predetermined clock period, the predetermined clock frequency being based on a worst-case clock frequency and being configured to set forth a respective effective core frequency at which the respective core of the plurality of cores performs circuit transitions. The apparatus further includes one or more sensors coupled to the respective core of the plurality of cores of the integrated circuit, the one or more sensors being configured to detect a respective level of voltage drop in a respective core caused by a time delay in performing a circuit transition and being configured to determine whether the respective level of voltage drop detected in the respective core necessitates an adjustment in a respective clock period of the clock signal output and, if so, the sensor dynamically adjusts the respective clock period of the clock signal output to provide a non-standard transition time to the respective core for completing the circuit transition. In an embodiment, the sensor includes an embedded delay line of logic gates. In an embodiment, the sensor monitors the clock rising edge and the clock falling edge of the clock signal and dynamically adjusts the predetermined clock period at the clock falling edge to provide more time to the core to complete the circuit transition. In an embodiment, if the sensor output signal generated is not detected before a clock falling edge of the clock signal, the sensor triggers adjustment of the predetermined clock period at the clock falling edge of the clock signal to provide more time to the core in the microprocessor to complete the transition between states, such that, the effective clock frequency of the core in the microprocessor is adjusted. On the other hand, if the sensor output signal generated is detected before the clock falling edge of the clock signal, the sensor does not trigger adjustment of the predetermined clock period at the clock falling edge of the clock signal, such that, the effective clock frequency of the core in the microprocessor remains unadjusted. In an embodiment, the effective clock frequency for the core is calculated based on an average clock period calculated for the core using a sum of dynamically adjusted and unadjusted clock periods, the effective clock frequency being faster than the worst-case clock frequency. Further, in an embodiment, the respective clock period is dynamically adjusted by the sensor by an order including at least one of: a clock cycle, a multiple of the clock cycle or an integer fraction of the clock cycle.

In another aspect of the invention, there is provided a method for optimizing performance of a microprocessor. The method includes providing a microprocessor having at least one core, the microprocessor being coupled to an adjustable clock source configured to supply a clock signal to the core, the clock signal having a predetermined clock frequency based on a worst-case clock frequency, the predetermined clock frequency being an inverse of a predetermined clock period, connecting a local voltage power source to the core in the microprocessor, supplying at least one sensor coupled to the core and configured to detect a change in voltage levels in the core, when the core in the microprocessor is transitioning between states, and dynamically adjusting, based on an output signal generated by the sensor supplied, the predetermined clock period of the adjustable clock source to allow a non-standard time to the core to complete transitioning between states, wherein an effective core frequency of the core is optimized and wherein performance of the microprocessor is optimized. The method further includes utilizing at least one decoupling capacitor coupled to the core, the at least one decoupling capacitor being configured to filter out any sudden change in voltage levels in the local voltage power source supplied to the core and being configured to function as a local battery to provide power to the core in the microprocessor when necessary, wherein any sudden change in the voltage level includes at least one of: a drop in power supply voltage and a bounce in ground voltage. In an embodiment, the sensor includes an embedded delay line of logic gates. In an embodiment, the sensor is configured to determine whether or not the sensor output signal generated is detected within the predetermined clock period, wherein if the sensor output signal generated is not detected within the predetermined clock period, the sensor dynamically adjusts the predetermined clock period of the clock signal to allow the core more time to complete the transitioning between states and wherein if the sensor output signal generated is detected within the predetermined clock period, the sensor does not trigger adjustment of the predetermined clock period and wherein the effective clock frequency of the core remains unadjusted. The method further includes providing a microprocessor having at least two cores, connecting a separate local voltage power source to a respective core of the at least two cores in the microprocessor, supplying at least two sensors, a respective sensor of the at least two sensors being coupled to a respective core of the at least two cores, the respective sensor being configured to detect a change in voltage levels in the respective core of the at least two cores when the respective core in the microprocessor is transitioning between states and dynamically adjusting, based on an output signal from the respective sensor supplied, the predetermined clock period of the adjustable clock source to allow a non-standard time to the respective core to complete transitioning between states, wherein an effective core frequency of the respective core is optimized and wherein performance of the microprocessor is optimized. In an embodiment, the dynamically adjusting step further includes dynamically adjusting the clock period by an order that includes at least one of: a clock cycle, a multiple of the clock cycle or an integer fraction of the clock cycle.

In another aspect, the invention provides a method for optimizing performance of a clocked digital system. The method includes providing a multi-core clocked digital system having a plurality of cores, the multi-core clocked digital system being coupled to an adjustable clock source configured to supply a clock signal having a predetermined clock frequency based on a worst-case clock frequency and a predetermined clock period, the predetermined clock period being an inverse of the predetermined clock frequency. The method further includes supplying a separate local voltage power source to each respective core of the plurality of cores within the multi-core clocked digital system, coupling a respective decoupling capacitor to each respective core of the plurality of cores, the respective decoupling capacitor being configured to filter out sudden changes in voltage levels in the separate local voltage power source supplied to each respective core and being configured to function as a local battery to provide power to each respective core in the multi-core clocked digital system when necessary, connecting the sensor to each respective core, the sensor being configured to detect at least one level of voltage drop caused by a state transition of each respective core in the multi-core clocked digital system and dynamically adjusting, based on an output signal generated by the sensor connected to a respective core, a clock period of the adjustable clock source for the respective core for completing the state transition, wherein performance of the clocked digital system is optimized via an adjustment in an effective frequency of the respective core. In an embodiment, the sensor monitors a clock rising edge and a clock falling edge of the clock signal and triggers adjustment of the clock period at the clock falling edge to provide more time to the respective core to complete the state transition. Further, in an embodiment, the sensor is configured to determine whether or not the sensor output signal generated is detected within the predetermined clock period, wherein if the sensor output signal generated is not detected within the predetermined clock period, the sensor dynamically adjusts the predetermined clock period of the clock signal to allow the respective core more time to complete the transitioning between states and wherein if the sensor output signal generated is detected within the predetermined clock period, the sensor does not trigger adjustment of the predetermined clock period and wherein the effective clock frequency of the respective core remains unadjusted. In an embodiment, the effective core frequency for the respective core is calculated based on an average clock period calculated for the core using a sum of dynamically adjusted and unadjusted clock periods, the effective core frequency being faster than the worst-case clock frequency. In an embodiment, the sensor includes an embedded delay line of logic gates. In an embodiment, the sensor dynamically adjusts the clock period by an order that includes at least one of: a clock cycle, a multiple of the clock cycle or an integer fraction of the clock cycle.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides an apparatus for micro-tuning an effective clock frequency of a core in a microprocessor. The apparatus comprises a microprocessor including at least one core having logic that is configured to transition between states, a clock signal coupled to the microprocessor, the clock signal having a predetermined clock frequency based on a worst-case clock frequency and a predetermined clock period, the predetermined clock period being an inverse of the predetermined clock frequency. The apparatus further comprises at least one sensor coupled to the core in the microprocessor, the sensor being configured to generate a sensor output signal for detecting at least one level of voltage drop in the core when the logic within the core is transitioning between states, the sensor being configured to determine whether or not the sensor output signal generated is detected within the predetermined clock period, such that, if the sensor output signal generated is not detected within the predetermined clock period, the sensor dynamically adjusts the predetermined clock period of the clock signal provided to the core to allow more time to complete the transitioning between states and where dynamically adjusting the predetermined clock period effectively changes an effective clock frequency of the core in the microprocessor. In an embodiment, the sensor dynamically adjusts the clock period within an order of one clock cycle.

In another embodiment, the invention provides an apparatus for improving performance of a synchronous digital system. The apparatus comprises a synchronous digital system including an integrated circuit comprised of a plurality of cores, a respective power supply configured to supply a respective voltage to a respective core of the plurality of cores of the integrated circuit, a clock signal source having a clock signal input coupled to the synchronous digital system and a clock signal output coupled to the integrated circuit, the clock signal source having a predetermined clock frequency and a predetermined clock period, the predetermined clock frequency being based on a worst-case clock frequency and being configured to set forth a respective effective core frequency at which the respective core of the plurality of cores performs circuit transitions. The apparatus further comprises one or more sensors coupled to the respective core of the plurality of cores of the integrated circuit, the one or more sensors being configured to detect a respective level of voltage drop in a respective core caused by a time delay in performing a circuit transition and being configured to determine whether the respective level of voltage drop detected in the respective core necessitates an adjustment in a respective clock period of the clock signal output and, if so, the sensor dynamically adjusts the respective clock period of the clock signal output to provide a non-standard transition time to the respective core for completing the circuit transition. In an embodiment, the sensor comprises an embedded delay line of logic gates. In an embodiment, the sensor monitors the clock rising edge and the clock falling edge of the clock signal and dynamically adjusts the predetermined clock period at the clock falling edge to provide more time to the core to complete the circuit transition. In an embodiment, if the sensor output signal generated is not detected before a clock falling edge of the clock signal, the sensor triggers adjustment of the predetermined clock period at the clock falling edge of the clock signal to provide more time to the core in the microprocessor to complete the transition between states, such that, the effective clock frequency of the core in the microprocessor is adjusted. On the other hand, if the sensor output signal generated is detected before the clock falling edge of the clock signal, the sensor does not trigger adjustment of the predetermined clock period at the clock falling edge of the clock signal, such that, the effective clock frequency of the core in the microprocessor remains unadjusted. In an embodiment, the effective clock frequency for the core is calculated based on an average clock period calculated for the core using a sum of dynamically adjusted and unadjusted clock periods, the effective clock frequency being faster than the worst-case clock frequency. Further, in an embodiment, the respective clock period is dynamically adjusted by the sensor by an order comprising at least one of: a clock cycle, a multiple of the clock cycle or an integer fraction of the clock cycle.

Figure 1:
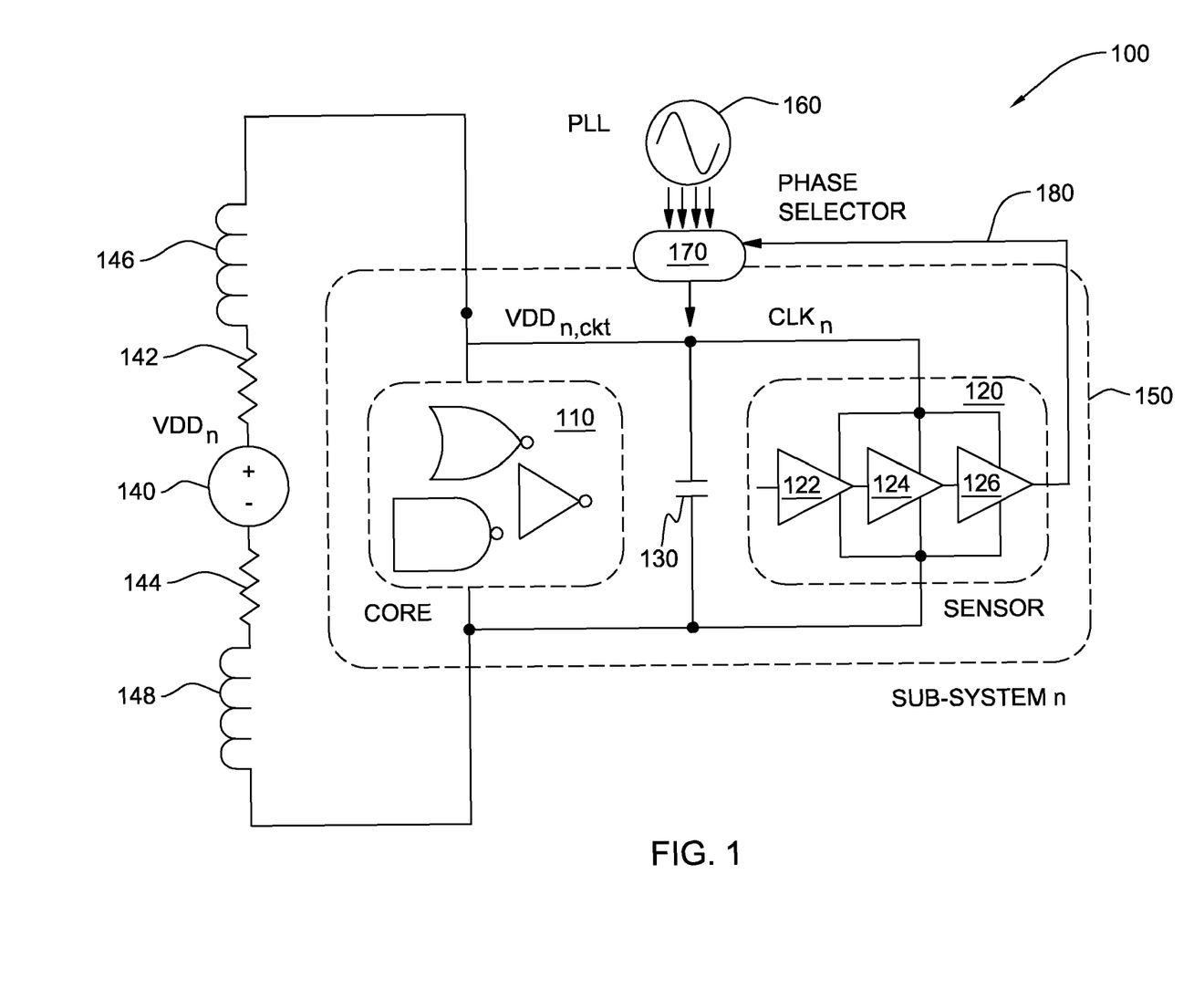
FIG. 1 is a schematic block diagram of a sub-system that includes a core and a voltage drop sensor for micro-tuning an effective clock frequency of the core, the sub-system having a single PLL (Phase-Locked Loop) configured to deliver a multiple-phase clock output to the core and sub-system, in accordance with an embodiment of the invention.
Figure 2:
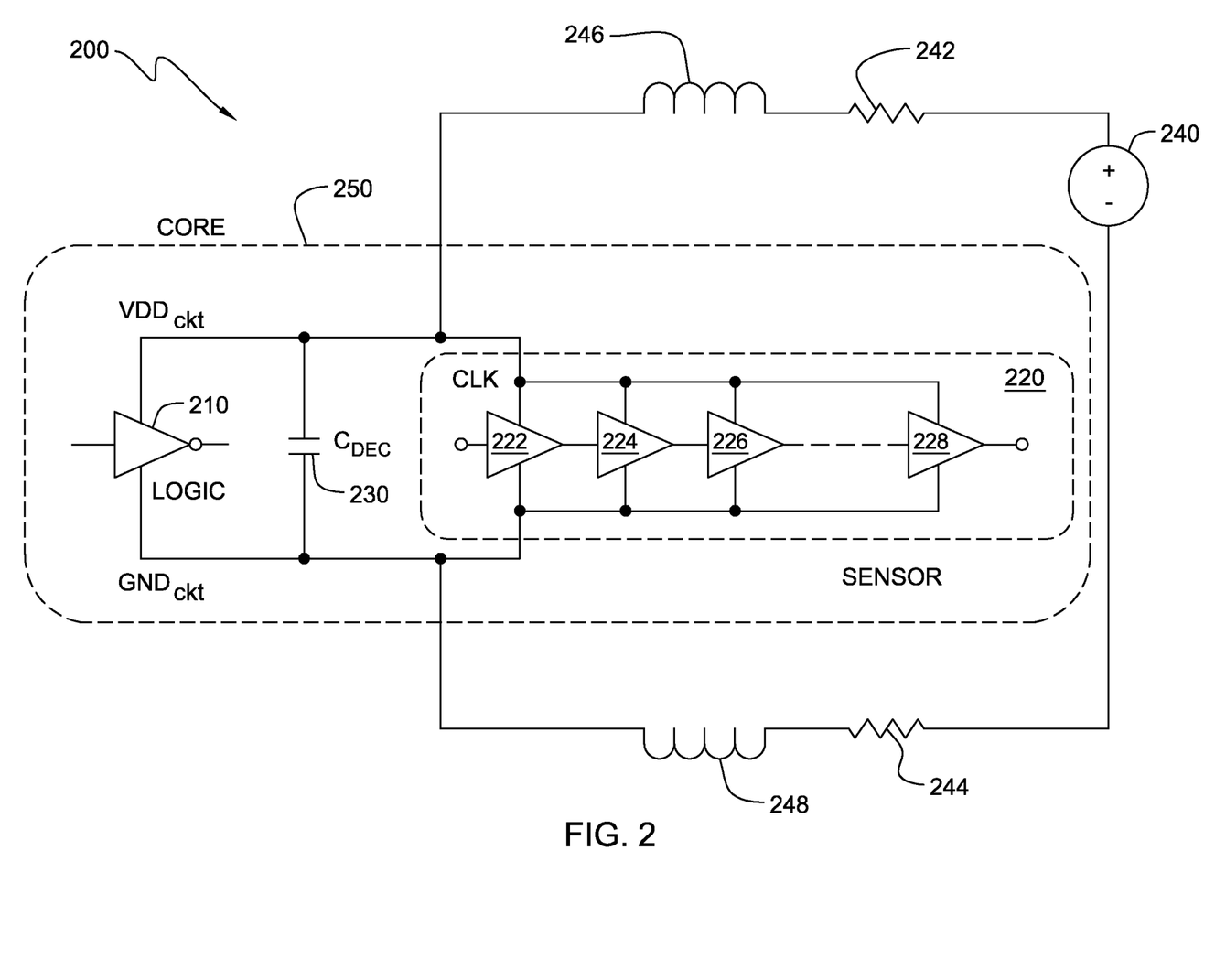
FIG. 2 is a schematic block diagram of a core in a sub-system having a voltage drop sensor for micro-tuning an effective clock frequency of the core, in accordance with an embodiment of the invention.
Figure 3:
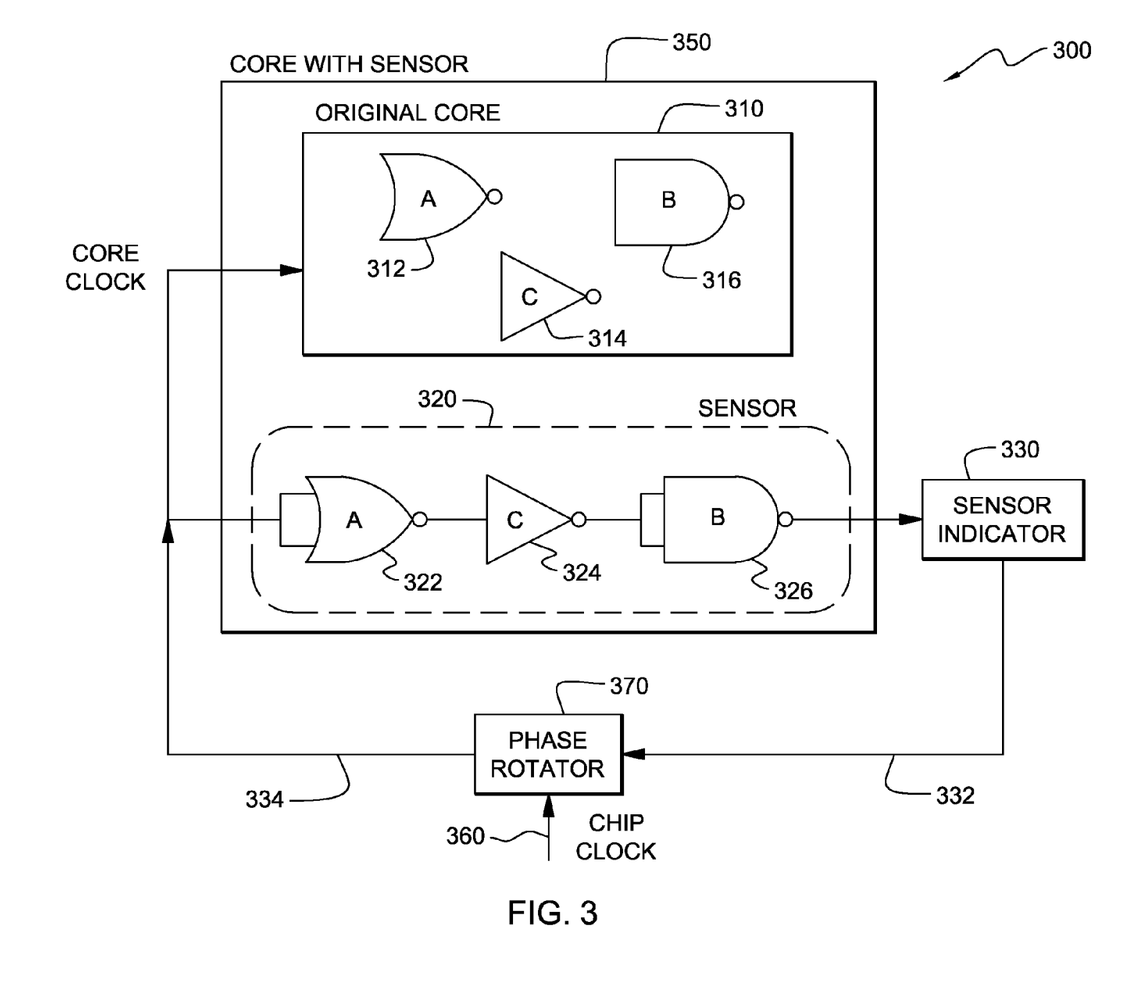
FIG. 3 is a schematic block diagram of a voltage drop sensor coupled to a core for detecting a voltage drop in a core for micro-tuning an effective clock frequency of the core, in accordance with an embodiment of the invention.

Reference is now made to FIGS. 1 through 3, which depict an apparatus for micro-tuning an effective clock frequency of a core in a microprocessor. In particular, reference numeral 100 in FIG. 1 depicts an embodiment of a clocked digital sub-system n (reference numeral 100) used in a microprocessor having at least a single core 150. The sub-system n (reference numeral 100) is further shown connected to an external power supply $VDD_n$ (reference numeral 140) that supplies a local power supply voltage $VDD_{n,ckt}$ to the core 150 and the local sub-system n (reference numeral 100). Although, not shown, the sub-system 100 can include multiple cores 150 that are coupled to each other, with each core preferably having a designated or separate local power supply VDD. Further, in an embodiment, the wiring for sub-system n (reference numeral 100) includes two resistors 142 and 144 and also comprises two inductors 146 and 148 designed to prohibit sudden changes in current drawn by the sub-system 100 when the sub-system 100 is making state transitions during switching activities. In addition, the sub-system 100 comprises a decoupling capacitor 130, which serves as a local charge reservoir when there are large logic switching activities within the logic 110 of the core 150 that require the decoupling capacitor 130 to supply current to the core 150 and, also, prevents the sub-system 100 from being affected by switching activities that occur in another part of the sub-system, for example, if there are multiple cores with multiple circuits in the sub-system 100. Further, the sub-system 100 is connected to a PLL (Phase-Locked Loop) circuit, which delivers a multi-phase clock ($CLK_n$) signal to the core 150 and sub-system 100. The PLL further comprises a VCO (Voltage Controlled Oscillator) 160 and a phase selector or phase rotator or phase detector 170. In an embodiment, the phase selector or phase detector 170 selects a clock phase for clocking the core 150 and the sub-system 100. In an embodiment, the phase selector or phase detector 170 within the PLL circuit may comprises a programmable divider for changing frequency of the clock signal ($CLK_n$) delivered to the core 150 and sub-system 100. Further, as shown in FIG. 1, the core 150 is coupled to a voltage drop sensor 120 (also referred to herein as simply sensor), which, in an embodiment, is configured to monitor when there is a settling time delay in the logic 110 in the core 150 within sub-system 100 due to large logic switching activity in the core 150. In an embodiment, as shown in FIG. 1, the sensor 120 comprises an embedded delay line of logic gates (reference numerals 122, 124 and 126) for temporarily adjusting (shown by arrow 180) a clock phase selected by the phase selector 170 in order to allow more time for the logic 110 to complete state transitions, as explained herein below with respect to FIGS. 4-7. In an embodiment, the sensor comprises an N-stage sensor that uses digital logic comprising of an inverter-based time delay line, and where the circuit composition of the sensor logic gate is similar to the core's circuit composition, as explained further herein below with respect to FIG. 3. Further, in an embodiment, the sensor delay is programmable.

Turning to FIG. 2, reference numeral 200 depicts an embodiment of a digital circuit 200 used in a microprocessor, but without the PLL circuit that delivers the multi-phase clock to the digital circuit, as shown in FIG. 1. The digital circuit 200 comprises at least one core 250 within the digital circuit 200, for instance, a digital circuit used in a microprocessor. The core 250 is shown to be coupled or connected to a separate local power supply VDD (reference numeral 240) that supplies a local power supply voltage to the core 250 and the digital circuit 200. Although, not shown, the digital circuit 200 can include multiple cores 250 that are coupled to each other with each core preferably having a designated or separate local power supply VDD. Further, in an embodiment, the wiring for the digital circuit 200 includes two resistors 242 and 244 and also comprises two inductors 246 and 248 designed to prohibit sudden changes in current drawn by the digital circuit 200, when the logic 210 within the core 250 is transitioning between states. In addition, the digital circuit 200 comprises a decoupling capacitor ($C_{DEC}$) 230, which in an embodiment, serves as a local charge reservoir, for instance, when large logic switching activities within the logic 210 of the core 250 require the decoupling capacitor 230 to supply current to the core 250. Further, the decoupling capacitor 230 prevents the circuit 200 from being affected by switching activities that happen in another part of the circuit. Although, not shown in FIG. 2, the core 250 and digital circuit 200 receives a multi-phase clock signal ($CLK_n$) input from a clock source, such as, the PLL (Phase-Locked Loop) circuit (shown in FIG. 1) for clocking the core 250 and the digital circuit 200. Further, as shown in FIG. 2, the core 250 is coupled to a voltage drop sensor 220, which in an embodiment, is configured to monitor when there is a settling time delay in the logic 210 in the core 250 within digital circuit 200 due to large logic switching activities in the core 250. The sensor 220 is configured to adjust a clock phase to allow more time, temporarily, for the logic 210 within digital circuit 200 to complete the switching activities, as further explained herein below with respect to FIGS. 4-7. In an embodiment, as shown in FIG. 2, the sensor 220 comprises an embedded delay line of logic gates 222, 224, 226 through 228 for temporarily adjusting a clock phase to allow more time for the logic 210 to complete state transitions within digital circuit 200. In an embodiment, the sensor uses a digital logic inverter-based time delay line for temporarily adjusting the clock phase to allow more time for the logic 210 to complete state transitions.

Reference is now made to FIG. 3, which shows another embodiment of a clocked digital system 300, for instance, a clocked digital system used in a chip or a microprocessor. The clocked digital system 300 comprises at least one core 350 that comprises of digital logic 310 and a sensor 320. Although not shown in FIG. 3, the core 350 in the clocked digital system 300 is powered by a separate local power supply VDD (as shown in FIGS. 1 and 2, but not in FIG. 3). Again, although only one core 350 is shown in FIG. 3, the clocked digital system 300 can comprise of more than one core 350, where each core in the clocked digital system is powered by a separate local power supply VDD. Further, the wiring for the clocked digital system 300 includes resistors, inductors and a decoupling capacitor that can serve as a local charge reservoir when large logic switching activities within the logic 310 of the core 350 require the decoupling capacitor to supply current to the core 350. Further, as shown in FIG. 3, the core 350 and the clocked digital system 300 receive a clock signal input for the entire chip or microprocessor from a clock source (not shown in FIG. 3), such as, the PLL (Phase-Locked Loop) circuit (shown in FIG. 1), which comprises a phase selector/rotator for selecting a clock phase from the multi-phase clock provided by the PLL for clocking the core 350 and the clocked digital system 300. Further, as shown in FIG. 3, the core 350 is coupled to a voltage drop sensor 320, which in an embodiment, comprises a sensor indicator or a voltage drop indicator 330 (also referred to herein simply as drop indicator), which is configured to monitor a voltage drop that causes a settling time delay in the logic 310 in the core 350 within the clocked digital system 300 whenever there are large logic switching activities occurring in the core 350. In an embodiment, the sensor 320 provides an output of whether or not there is a delay in transition time for activities occurring within the core 310 by measuring a voltage drop within the core 310. The sensor output from the sensor 320 is fed to the sensor indicator 330, which in an embodiment, is a decision circuit that decides whether or not to trigger adjustment of a clock phase of a core clock provided to the core 310 for allowing more transition time to perform switching activities within the core 310. Accordingly, if the sensor 320 provides an output to the sensor indicator 330 indicating a delay, then the sensor indicator 330 is configured to trigger (indicated by arrow 332) adjustment of the clock phase (selected by the phase selector or phase rotator 370) of the clock provided to the chip or microprocessor (that is, the chip clock delivered (indicated by arrow 360) to the entire chip or microprocessor by the PLL shown in FIG. 1). As such, adjustment of the clock phase of the clock delivered (indicated by arrow 334) to the core 310 (that is, the core clock) allows more time, temporarily, for the logic within the core to complete transitioning, as further explained herein below with respect to FIGS. 4-7. In an embodiment, as shown in FIG. 2, the sensor 320 comprises an N-stage sensor having an embedded delay line of logic gates with a logic composition that assimilates the logic composition of the observed core 310. As shown in FIG. 3, if the logic in the core 310 is comprised of inverters 314, NOR gates 312 and NAND gates 316, then the sensor logic is also composed of inverters 324, NOR gates 322 and NAND gates 326. For example, if the core is comprised of 20% inverters, 30% NOR gates and 50% NAND gates, and if the sensor is a 10-stage sensor, than the sensor logic is composed of 2 inverters, 3 NOR gates and 5 NAND gates corresponding to the composition of the core circuit.

Figure 4:
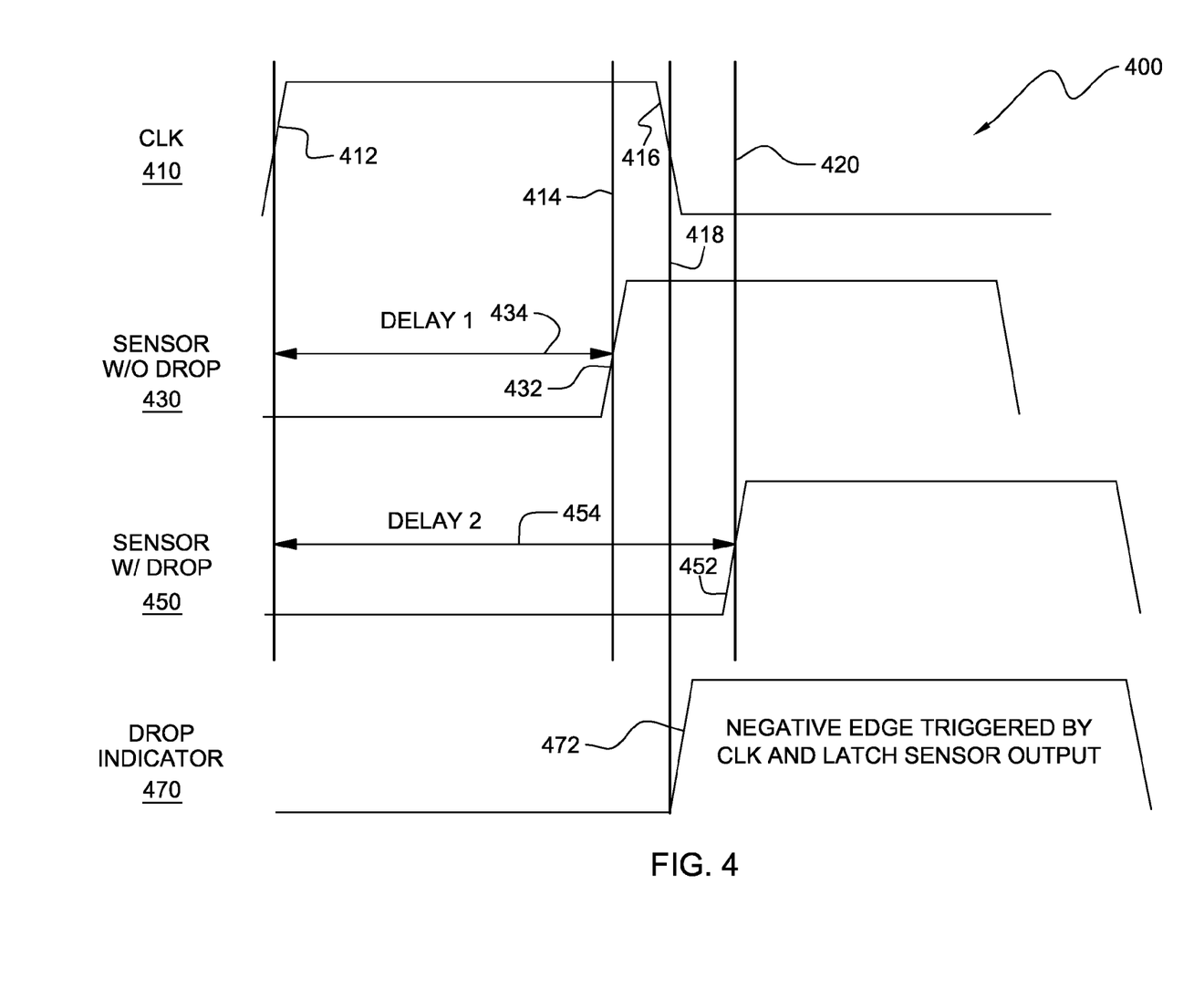
FIG. 4 is a schematic diagram illustrating an operation of a voltage drop sensor coupled to a core, in accordance with an embodiment of the invention.

Turning to FIG. 4, reference numeral 400 graphically displays the operation of a voltage drop sensor (as shown in FIGS. 1-3) having a voltage drop indicator or drop indicator (shown in FIG. 3) that is configured to trigger adjustment of the clock phase of the clock (core clock) delivered to the core to allow more time, temporarily, for the logic within the core to complete switching activities. As shown in FIG. 4, a clock signal 410 is provided to the core in a microprocessor or a clocked digital system. The clock signal has a rising edge or positive edge 412, where the clock signal transitions from low to high, and a falling edge or negative edge 416, where the clock signal transitions from high to low. Further, in FIG. 4, the vertical line 414 represents a point-in-time before the falling edge 416 of the clock signal 410, whereas, the vertical line 418 represents a point-in-time during the falling edge 416 of the clock signal 410 and the vertical line 420 represents a point-in-time after the falling edge 416 of the clock signal 410. In an embodiment, the core logic transitions between states using the clock signal 410, where the positive edge 412 of the clock signal 410 activates the core circuit, whereas, the negative edge 416 of the clock signal 410 deactivates the core circuit. However, it will be apparent to one skilled in the art that the core circuit may be designed to be activated at the negative edge of the clock signal and deactivated at the positive edge of the clock signal. Referring to FIG. 4, reference numeral 400 further shows two sensor output signals, the first sensor output signal 430 representing no voltage drop detected within a core circuit being observed and the second sensor output signal 450 representing a voltage drop detected within the core circuit by the sensor. Referring to the first sensor output signal 430, the sensor, which is configured to measure the transition time for the switching activities within the core, determines whether or not a sensor signal is detected before the falling edge or negative edge 416 of the clock signal 410. As such, if the sensor signal 432 is detected before the vertical line 418 representing a point-in-time corresponding to the falling edge 416 of the clock signal, then the sensor determines that the delay (delay 1, reference numeral 434) is relatively short and, thus, the output provided to the drop indicator 470 does not trigger any adjustments in the clock signal provided to the core for providing more transition time to the core. However, referring to the second sensor output signal 450, if the sensor does not detect the sensor signal 452 until some point-in-time 452 after the point-in-time 418 representing the negative edge 416 of the clock 410, then the sensor determines that the delay (delay 2, reference numeral 454) is relatively longer and, thus, the output provided to the drop indicator circuit 470 triggers (reference numeral 472) an adjustment of the clock signal provided to the core at the falling edge for providing more transition time to the core, as described above with respect to FIG. 3 and described further herein below with respect to FIGS. 5 and 6.

Figure 5:
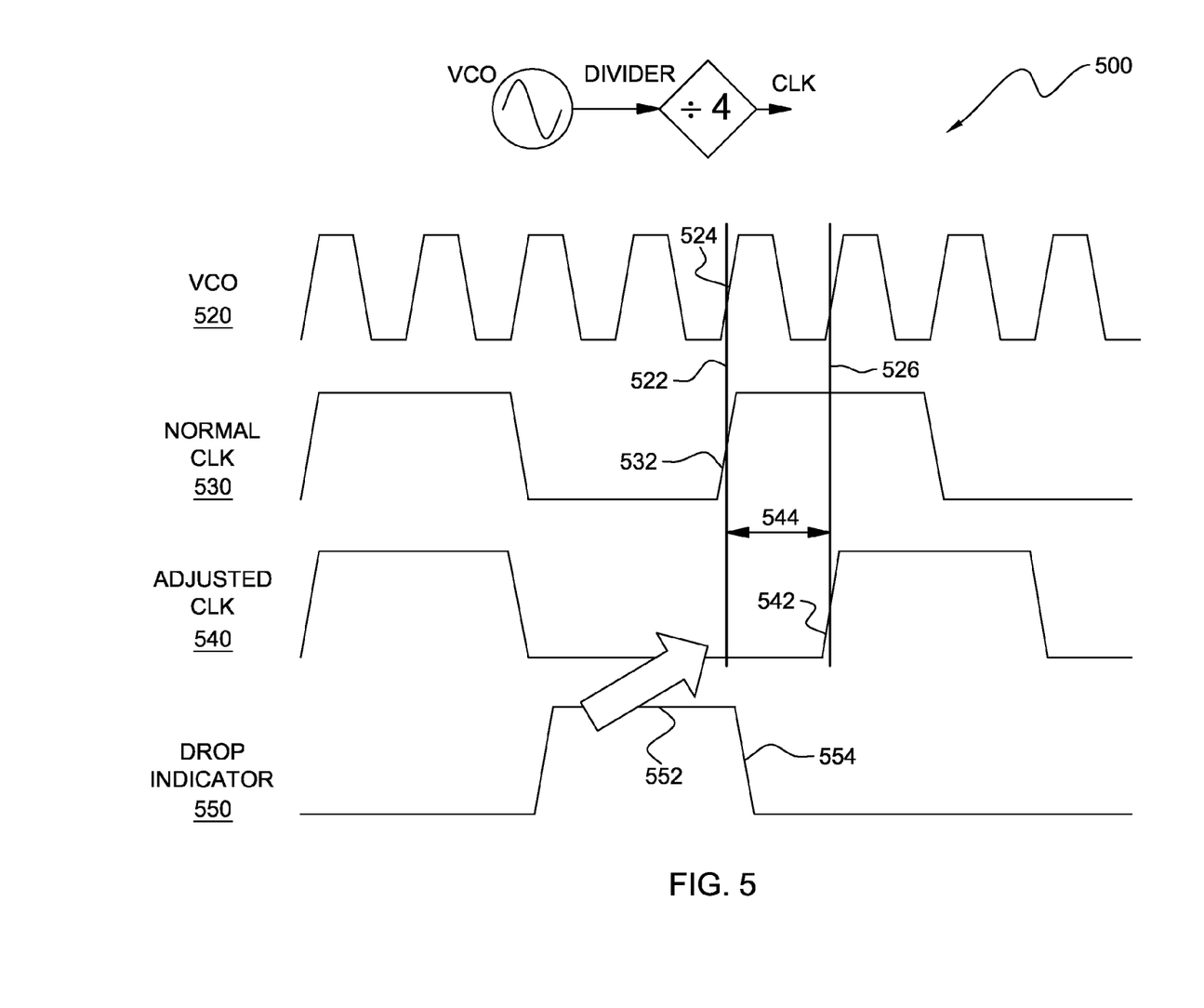
FIG. 5 is a schematic diagram illustrating a clock adjustment of a digital system with a Voltage Controlled Oscillator (VCO) and a divide-by-4 divider in the PLL (Phase-Locked Loop), in accordance with an embodiment of the invention.

In FIG. 5, reference numeral 500 shows a PLL (Phase-Locked Loop) having a VCO (Voltage Controlled Oscillator) and a frequency divider, namely a divide-by-4 frequency divider. In an embodiment, as shown in FIG. 5, the waveform for the VCO signal 520 has a cycle that is four times faster than the waveform for the normal clock signal 530. The vertical line 522 represents the rising edge or positive edge of the fifth VCO cycle of the VCO signal 520 and represents the rising or positive edge of the second clock cycle for the normal clock signal 530. In an embodiment, as shown in FIG. 3, the voltage drop or sensor indicator circuit, part of the voltage drop sensor, detects or determines whether or not there is a measurable voltage drop based on the sensor output provided for the observed core in the microprocessor. If a voltage drop is not detected by the drop indicator circuit, that is, the voltage remains steady (reference numeral 552 in the drop indicator output 550), the clock phase is not adjusted and the clock cycle is maintained, thus, the rising edge 532 of the clock output would look the same as the normal clock signal 530. However, if the drop indicator detects a voltage drop (reference numeral 554 in output 550), then the drop indicator circuit is turned on to adjust the clock, such that, the rising edge 542 of the clock output 540 is delayed or adjusted (represented by reference numeral 544) by one VCO period or cycle (shown by vertical lines 524 and 526), thus, giving the core circuit more time to make state transitions.

Figure 6:
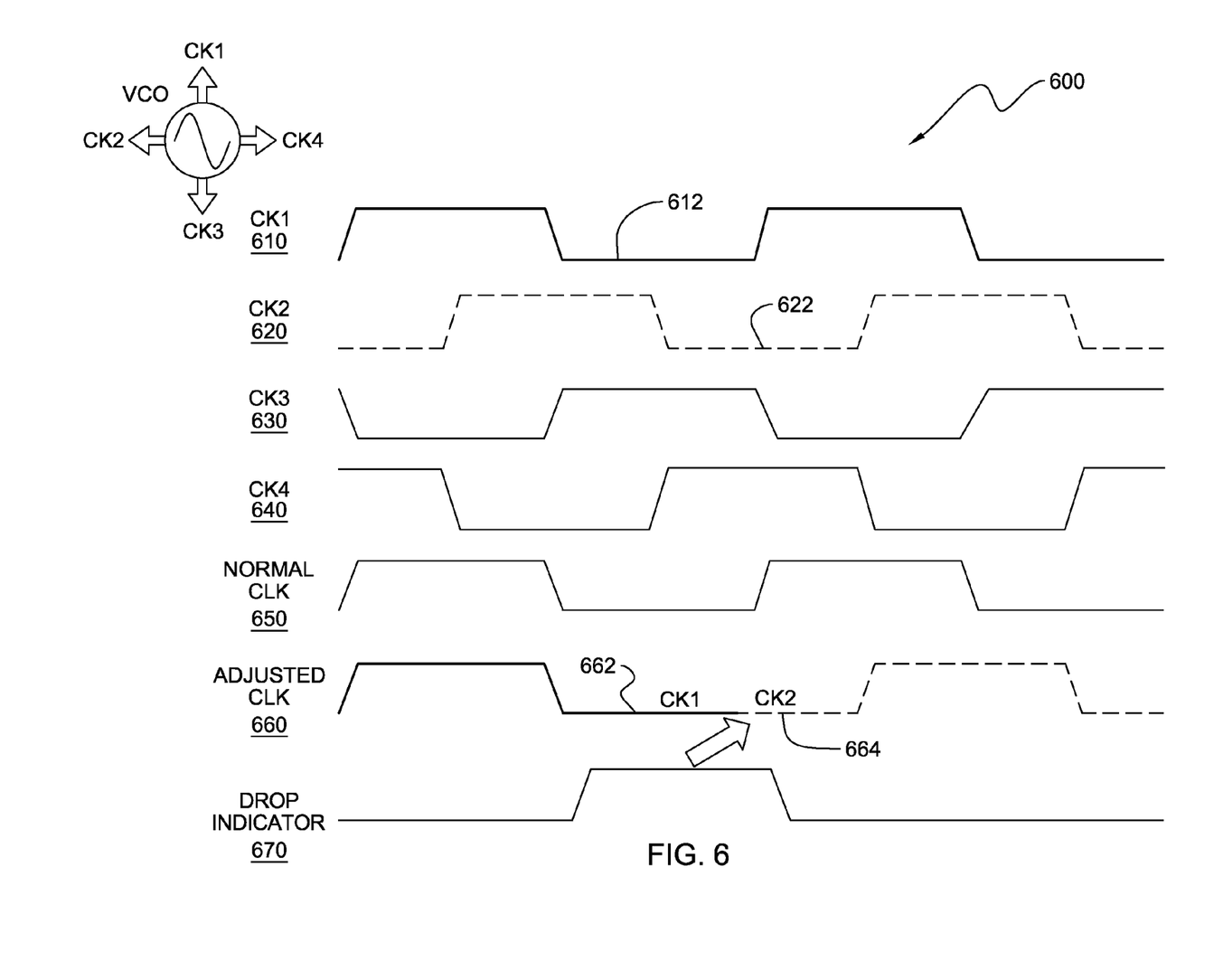
FIG. 6 is a schematic diagram illustrating a clock adjustment of a digital system with a 4-phase clock signal, in accordance with an embodiment of the invention.

Turning to FIG. 6, reference numeral 600, shows an example of a PLL (Phase-Locked Loop) having a VCO (Voltage Controlled Oscillator) having the same clock frequency as the normal clock frequency 650. The clock frequency comprises four phases, CK1 (whose output is shown by reference numeral 610), CK2 (whose output is shown by reference numeral 620), CK3 (whose output is shown by reference numeral 630) and CK4 (whose output is shown by reference numeral 640). In an embodiment, as shown in FIG. 6, CK1 (reference numeral 610) is selected by the phase selector (shown in FIG. 1) from the four phases CK1, CK2, CK3 and CK4. When there is no voltage drop detected in the observed core in the microprocessor by a drop indicator circuit based on the sensor output provided by a voltage drop sensor, the phase selector remains with phase CK1 and the normal clock frequency waveform 650 follows that of CK1, reference numeral 610. However, when the drop indicator circuit detects a voltage drop in the observed core in the microprocessor based on the sensor output provided by a voltage drop sensor, the phase selector (shown in FIG. 1) adjusts the clock by shifting to CK2 (reference numeral 620), thus, providing an increased clock period, that follows the latter part of CK1 waveform (reference numeral 612) and, in addition, follows part of CK2 waveform (reference numeral 622), which is shown by reference numerals 662 and 664 in the adjusted clock waveform 660, thus, allowing more time to complete a state transition.

Figure 7:
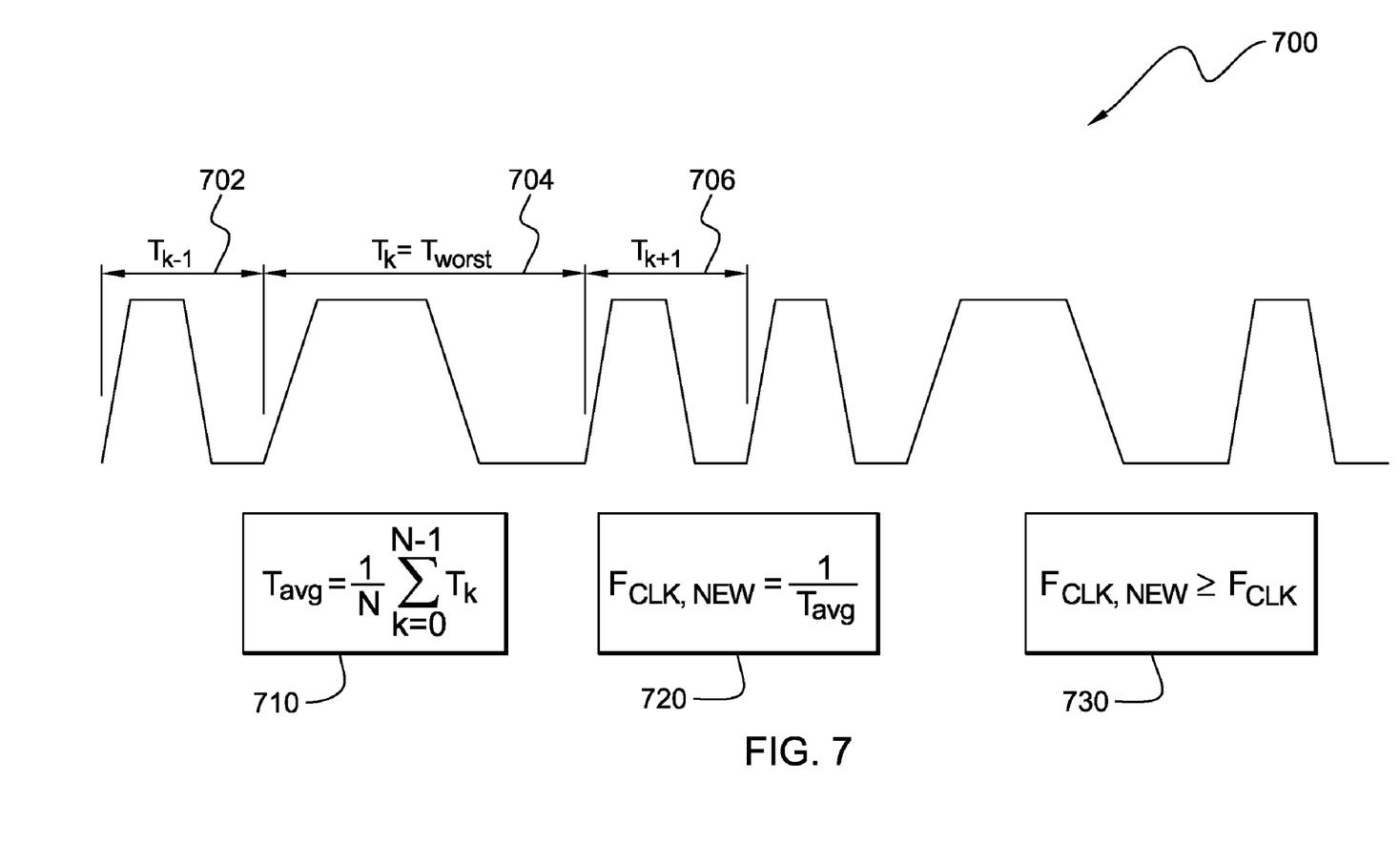
FIG. 7 is a schematic diagram illustrating a performance improvement resulting from micro-tuning an effective clock frequency of a core, in accordance with an embodiment of the invention.

Turning to FIG. 7, reference numeral 700 shows the improved average clock period when a voltage drop sensor is used to adjust the clock output, as discussed herein above. Accordingly, in an embodiment, $T_k$ (reference numeral 704) is the clock period based on the worst case delay in the clock frequency. For N clock periods, the average clock period $T_{avg}$ is given by the sum of all the periods, including transitions that take less time and are less current-consuming transitions that take a shorter clock period, such as, $T_{k-1}$ (reference numeral 702) and $T_{k+1}$ (reference numeral 706) as per the formula shown in box 710 of FIG. 7. Further, the effective clock frequency, $F_{CLK,NEW}$ is the inverse of the average clock period, $T_{avg}$, which is given by box 720 in FIG. 7, where the new effective clock frequency is faster than the clock frequency, that is $F_{CLK, NEW} \geq F_{CLK}$ (reference numeral 730).

Figure 8A:
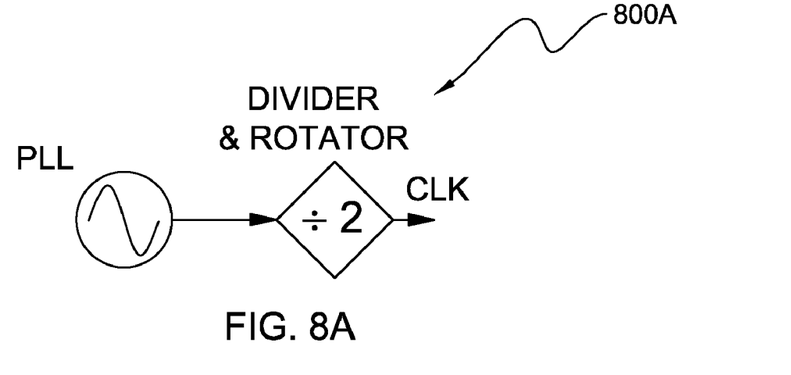
FIGS. 8A-8B illustrate a 2-phase clock adjustment of a digital system with a PLL (Phase-Locked Loop) and a divide-by-2 divider and phase rotator in the digital sub-system, along with a Moore state machine implementation, in accordance with an embodiment of the invention.
Figure 8B:
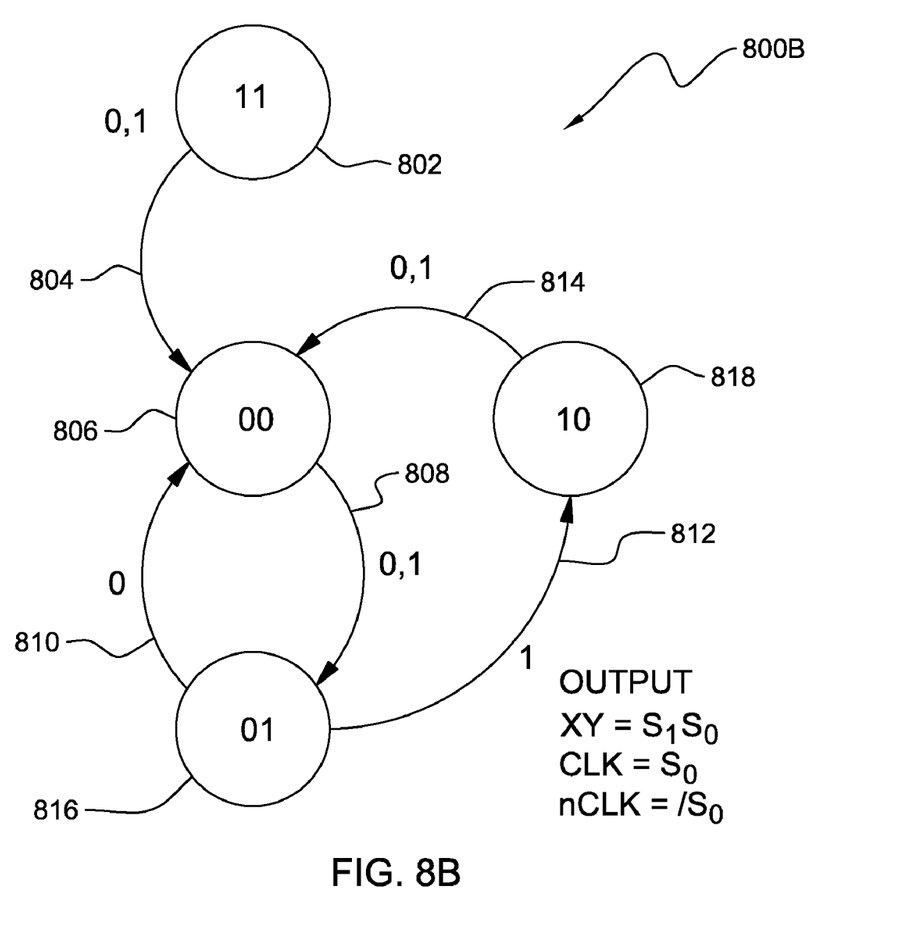

Turning to FIGS. 8A-8B, reference numeral 800A in FIG. A, shows a PLL (Phase-Locked Loop) and a frequency divider and rotator, namely a divide-by-2 frequency divider and phase shifter, and FIG. 8B, reference numeral 800B shows a Moore state machine implementation. As shown in FIG. 8B, there are four states, state 1 (11, reference numeral 802), state 2 (00, reference numeral 806), state 3 (01, reference numeral 816) and state 4 (10, reference numeral 818). The state transition condition is either 0 or 1, given that the output from the sensor is either 0 or 1. The second state (the second number within a state) is the output of the divider and the phase rotator, such that, state 1 (11, reference numeral 802) is the initial state when the state machine is first turned on, which state changes to state 2 (00, reference numeral 806), regardless of whether the input (indicated by arrow 804) is 0 or 1. Basically, state 2 is where the normal clock cycle follows that of phase 2. From state 2 (00, reference numeral 806), the state changes to state 3 (01, reference numeral 816), regardless of the drop sensor indicator input state (indicated by arrow 808) and the output clock makes a transition from 0 to 1. If the sensor input at stage 3 (01, reference numeral 816) is an input of 1 (indicated by arrow 812), then this indicates that the sensor output has not arrived within the clock edge and, thus, the drop indicator sensor delays the clock period (indicated by arrow 814) and the normal clock cycle follows the next phase of the clock cycle at state 4 (10, reference numeral 818) by extending or adjusting the clock period by one clock cycle of the PLL output or a 180-degree phase of the normal rotator output when a delay in state transition is needed, as explained in FIG. 4-6 herein above. On the other hand, a sensor input of 0 (indicated by arrow 810) indicates that the sensor output has arrived before the clock edge and, as such, there is no need to change the clock period and, as such, the state machine returns to state 2, that is, the normal clock cycle is not adjusted by changing rotator output to 0 from 1.

In another embodiment, the invention provides a method for optimizing performance of a microprocessor. The method comprises providing a microprocessor having at least one core, the microprocessor being coupled to an adjustable clock source configured to supply a clock signal to the core, the clock signal having a predetermined clock frequency based on a worst-case clock frequency, the predetermined clock frequency being an inverse of a predetermined clock period, connecting a local voltage power source to the core in the microprocessor, supplying at least one sensor coupled to the core and configured to detect a change in voltage levels in the core when the core in the microprocessor is transitioning between states and dynamically adjusting, based on an output signal generated by the sensor supplied, the predetermined clock period of the adjustable clock source to allow a nonstandard time to the core to complete transitioning between states, wherein an effective core frequency of the core is optimized and wherein performance of the microprocessor is optimized. The method further comprises utilizing at least one decoupling capacitor coupled to the core, the at least one decoupling capacitor being configured to filter out any sudden change in voltage levels in the local voltage power source supplied to the core and being configured to function as a local battery to provide power to the core in the microprocessor when necessary, wherein any sudden change in the voltage level comprises at least one of: a drop in power supply voltage and a bounce in ground voltage. In an embodiment, the sensor comprises an embedded delay line of logic gates. In an embodiment, the sensor is configured to determine whether or not the sensor output signal generated is detected within the predetermined clock period, wherein if the sensor output signal generated is not detected within the predetermined clock period, the sensor dynamically adjusts the predetermined clock period of the clock signal to allow the core more time to complete the transitioning between states and wherein if the sensor output signal generated is detected within the predetermined clock period, the sensor does not trigger adjustment of the predetermined clock period and wherein the effective clock frequency of the core remains unadjusted. The method further comprises providing a microprocessor having at least two cores, connecting a separate local voltage power source to a respective core of the at least two cores in the microprocessor, supplying at least two sensors, a respective sensor of the at least two sensors being coupled to a respective core of the at least two cores, the respective sensor being configured to detect a change in voltage levels in the respective core of the at least two cores when the respective core in the microprocessor is transitioning between states and dynamically adjusting, based on an output signal from the respective sensor supplied, the predetermined clock period of the adjustable clock source to allow a nonstandard time to the respective core to complete transitioning between states, wherein an effective core frequency of the respective core is optimized and wherein performance of the microprocessor is optimized. In an embodiment, the dynamically adjusting step further comprises dynamically adjusting the clock period by an order that comprises at least one of: a clock cycle, a multiple of the clock cycle or an integer fraction of the clock cycle.

In yet another embodiment, the invention provides a method for optimizing performance of a clocked digital system. The method comprises providing a multi-core clocked digital system having a plurality of cores, the multi-core clocked digital system being coupled to an adjustable clock source configured to supply a clock signal having a predetermined clock frequency based on a worst-case clock frequency and a predetermined clock period, the predetermined clock period being an inverse of the predetermined clock frequency. The method further comprises supplying a separate local voltage power source to each respective core of the plurality of cores within the multi-core clocked digital system, coupling a respective decoupling capacitor to each respective core of the plurality of cores, the respective decoupling capacitor being configured to filter out sudden changes in voltage levels in the separate local voltage power source supplied to each respective core and being configured to function as a local battery to provide power to each respective core in the multi-core clocked digital system when necessary, connecting the sensor to each respective core, the sensor being configured to detect at least one level of voltage drop caused by a state transition of each respective core in the multi-core clocked digital system and dynamically adjusting, based on an output signal generated by the sensor connected to a respective core, a clock period of the adjustable clock source for the respective core for completing the state transition, wherein performance of the clocked digital system is optimized via an adjustment in an effective frequency of the respective core. In an embodiment, the sensor monitors a clock rising edge and a clock falling edge of the clock signal and triggers adjustment of the clock period at the clock falling edge to provide more time to the respective core to complete the state transition. Further, in an embodiment, the sensor is configured to determine whether or not the sensor output signal generated is detected within the predetermined clock period, wherein if the sensor output signal generated is not detected within the predetermined clock period, the sensor dynamically adjusts the predetermined clock period of the clock signal to allow the respective core more time to complete the transitioning between states and wherein if the sensor output signal generated is detected within the predetermined clock period, the sensor does not trigger adjustment of the predetermined clock period and wherein the effective clock frequency of the respective core remains unadjusted. In an embodiment, the effective core frequency for the respective core is calculated based on an average clock period calculated for the core using a sum of dynamically adjusted and unadjusted clock periods, the effective core frequency being faster than the worst-case clock frequency. In an embodiment, the sensor comprises an embedded delay line of logic gates. In an embodiment, the sensor dynamically adjusts the clock period by an order that comprises at least one of: a clock cycle, a multiple of the clock cycle or an integer fraction of the clock cycle.

Figure 9:
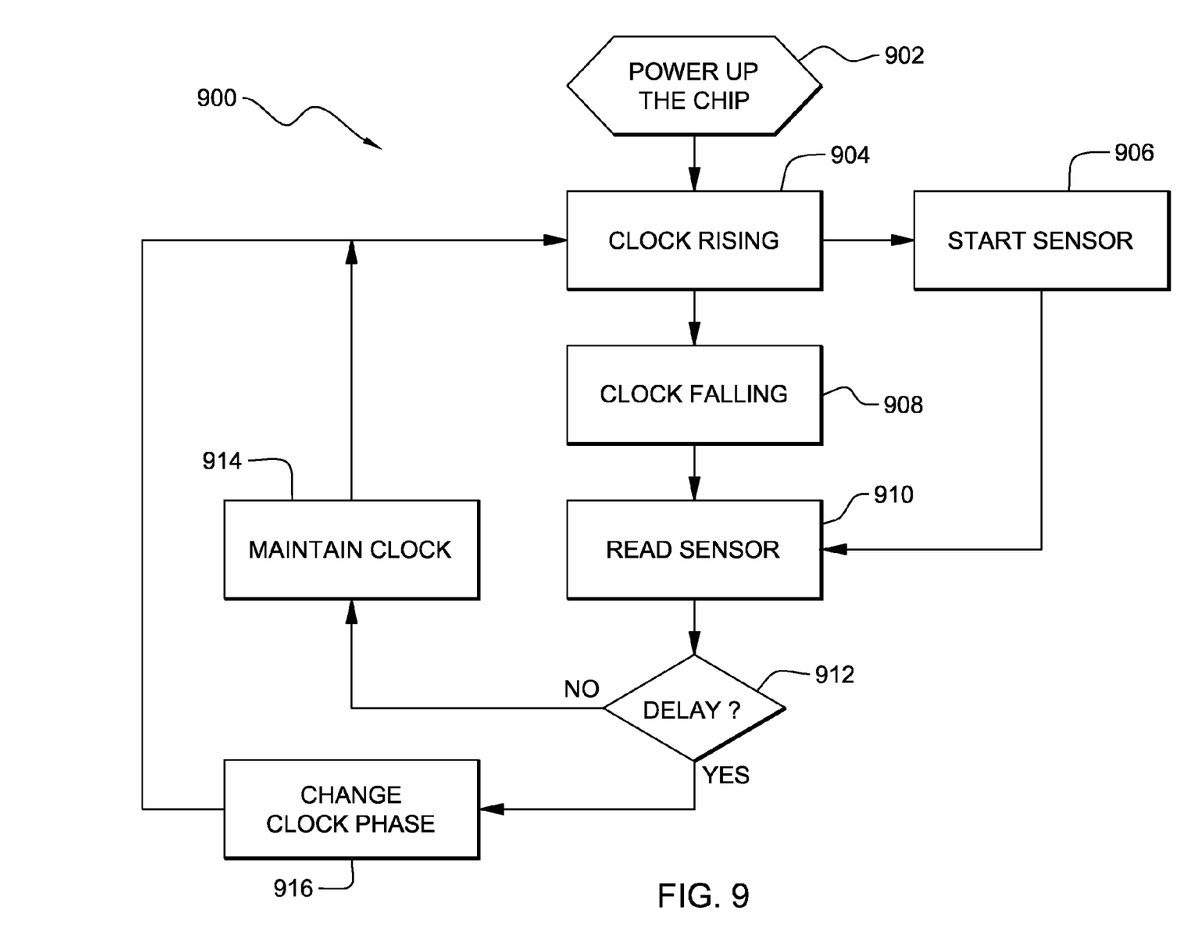
FIG. 9 is a flowchart illustrating a clock adjustment scheme of a digital system having an input clock signal, in accordance with an embodiment of the invention.

Turning to FIG. 9, reference numeral 900, depicts a flowchart outlining a method for determining whether or not to change a clock phase of a clock provided to the core for allowing more time to make state transitions. The method begins with step 902, where the chip or microprocessor is powered up. At a rising edge of a clock signal, step 904, the sensor is turned on or started in step 906. The sensor waits for the falling edge of the clock signal (step 408) before reading the sensor output in step 910. Based on the sensor output in step 910, the sensor determines in step 912 whether or not there is a delay in transition caused by a voltage drop and, if no delay is sensed, the clock is maintained in step 914, whereby the process is repeated starting with step 904 through step 912. On the other hand, if in step 912 the sensor determines that there is a delay in transition caused by a voltage drop when the circuit is transitioning, then the clock phase is changed or adjusted in step 916 in order to allow more time for the circuit to complete state transition. Accordingly, the invention momentarily increases the clock period when a voltage drop is sensed by the voltage drop sensor, which enhances the overall clock rate and increases the throughput of the microprocessor. Further, given that the invention is implemented by hardware, the dynamic adjustments to the clock cycle can be achieved relatively fast, in the order of a minimum clock cycle scale, returning to the original state quickly, if necessary. Thus, by separating the PLL and having discrete time step adjustments, changing the clock frequency in this manner ensures stability of a clocked digital system.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for micro-tuning an effective clock frequency of a core in a microprocessor, comprising:
    a microprocessor including at least one core, said at least one core comprising logic that is configured to transition between states;
    a clock signal coupled to said microprocessor, said clock signal having a predetermined clock frequency based on a worst-case clock frequency and a predetermined clock period, said predetermined clock period being an inverse of said predetermined clock frequency; and
    at least one sensor coupled to said at least one core in said microprocessor, said at least one sensor being configured to generate a sensor output signal for detecting at least one level of voltage drop in said at least one core when said logic within said at least one core is transitioning between states, said at least one sensor being configured to determine whether or not said sensor output signal generated is detected within said predetermined clock period, wherein if said sensor output signal generated is not detected within said predetermined clock period, said at least one sensor dynamically adjusts said predetermined clock period of said clock signal to allow said at least one core more time to complete said transitioning between states by temporarily delaying a rising edge of said clock signal to increase said predetermined clock period, and wherein if said sensor output signal generated is detected before a clock falling edge of said clock signal, said at least one sensor does not trigger adjustment of said predetermined clock period at said clock falling edge of said clock signal, wherein said effective clock frequency of said at least one core in said microprocessor remains unadjusted, and wherein dynamically adjusting said predetermined clock period effectively changes an effective clock frequency of said at least one core in said microprocessor.

2. The apparatus according to claim 1, wherein said at least one sensor dynamically adjusts said clock period within an order of one clock cycle.

3. The apparatus according to claim 2, wherein said at least one sensor comprises an embedded delay line of logic gates.

4. The apparatus according to claim 3, wherein if said sensor output signal generated is not detected before a clock falling edge of said clock signal, said at least one sensor triggers adjustment of said predetermined clock period at said clock falling edge of said clock signal to provide more time to said at least one core in said microprocessor to complete said transition between states, and wherein said effective clock frequency of said at least one core in said microprocessor is adjusted.

5. The apparatus according to claim 4, wherein said effective clock frequency for said at least one core is calculated based on an average clock period calculated for said at least one core using a sum of dynamically adjusted and unadjusted clock periods, said effective clock frequency being faster than said worst-case clock frequency, and wherein said respective clock period is dynamically adjusted by said at least one sensor by an order comprising at least one of: a clock cycle, a multiple of said clock cycle and an integer fraction of said clock cycle.

6. An apparatus for improving performance of a synchronous digital system, comprising:
    a synchronous digital system including an integrated circuit comprised of a plurality of cores;
    a respective power supply configured to supply a respective voltage to a respective core of said plurality of cores of said integrated circuit;
    a clock signal source having a clock signal input coupled to said synchronous digital system and a clock signal output coupled to said integrated circuit, said clock signal source having a predetermined clock frequency and a predetermined clock period, said predetermined clock frequency being based on a worst-case clock frequency and being configured to set forth a respective effective core frequency at which said respective core of said plurality of cores performs circuit transitions; and
    one or more sensors coupled to said respective core of said plurality of cores of said integrated circuit, said one or more sensors being configured to detect a respective level of voltage drop in a respective core caused by a time delay in performing a circuit transition and being configured to determine whether said respective level of voltage drop detected in said respective core necessitates an adjustment in a respective clock period of said clock signal output and, if so, said sensor dynamically adjusts said respective clock period of said clock signal output by temporarily delaying a rising edge of said clock signal to increase said predetermined clock period to provide a non-standard transition time to said respective core for completing said circuit transition, and wherein if said respective level of voltage drop arrives before a clock falling edge of said clock signal, said respective sensor does not trigger adjustment of said predetermined clock period at said clock falling edge of said clock signal and said respective sensor maintains said respective clock period of said clock signal output, and wherein said effective clock frequency of said respective core remains unadjusted.

7. The apparatus according to claim 6, wherein said respective clock period is dynamically adjusted by a sensor of said one or more sensors by an order comprising at least one of: a clock cycle, a multiple of said clock cycle and an integer fraction of said clock cycle.

8. The apparatus according to claim 7, wherein said sensor of said one or more sensors comprises an embedded delay line of logic gates.

9. The apparatus according to claim 8, wherein a respective sensor of said one or more is configured to generate a sensor output signal for detecting said at least one level of voltage drop in said respective core caused by said time delay in performing said circuit transition, said respective sensor being further configured to determine whether or not said sensor output signal generated is detected within said predetermined clock period, wherein if said sensor output signal generated is not detected within said predetermined clock period, said respective sensor dynamically adjusts said predetermined clock period of said clock signal to allow said respective core more time to complete said circuit transition, and wherein dynamically adjusting said predetermined clock period effectively changes an effective clock frequency of said respective core in said microprocessor.

10. The apparatus according to claim 9, wherein said respective sensor is configured to monitor said clock rising edge and said clock falling edge of said clock signal and dynamically adjusts said predetermined clock period at said clock falling edge to provide more time to said respective core to complete said circuit transition.

11. The apparatus according to claim 10, wherein said respective effective core frequency for said respective core is calculated based on an average clock period calculated for said respective core using a sum of dynamically adjusted and unadjusted clock periods, said respective effective clock frequency being faster than said worst-case clock frequency, and wherein said respective clock period is dynamically adjusted by said respective sensor by an order comprising at least one of: a clock cycle, a multiple of said clock cycle and an integer fraction of said clock cycle.

12. A method for optimizing performance of a microprocessor, said method comprising the steps of:
providing a microprocessor having at least one core, said microprocessor being coupled to an adjustable clock source configured to supply a clock signal to said at least one core, said clock signal having a predetermined clock frequency based on a worst-case clock frequency, said predetermined clock frequency being an inverse of a predetermined clock period;
connecting a local voltage power source to said at least one core in said microprocessor;
supplying at least one sensor coupled to said at least one core and configured to detect a change in voltage levels in said at least one core, when said at least one core in said microprocessor is transitioning between states; and
dynamically adjusting, based on an output signal generated by said at least one sensor supplied, said predetermined clock period of said adjustable clock source by temporarily delaying a rising edge of said clock signal to increase said predetermined clock period to allow a non-standard time to said at least one core to complete transitioning between states, and wherein if said sensor output signal generated is detected within said predetermined clock period, said at least one sensor does not trigger adjustment of said predetermined clock period, wherein said effective clock frequency of said at least one core remains unadjusted, and wherein an effective core frequency of said at least one core is optimized, and wherein performance of said microprocessor is optimized.

13. The method according to claim 12, further comprising the step of:
utilizing at least one decoupling capacitor coupled to said at least one core, said at least one decoupling capacitor being configured to filter out any sudden change in voltage levels in said local voltage power source supplied to said at least one core and being configured to function as a local battery to provide power to said at least one core in said microprocessor when necessary, wherein said any sudden change in voltage level comprises at least one of: a drop in power supply voltage and a bounce in ground voltage.

14. The method according to claim 13, wherein said at least one sensor comprises an embedded delay line of logic gates.

15. The method according to claim 14, wherein said at least one sensor is configured to determine whether or not said sensor output signal generated is detected within said predetermined clock period, wherein if said sensor output signal generated is not detected within said predetermined clock period, said at least one sensor dynamically adjusts said predetermined clock period of said clock signal to allow said at least one core more time to complete said transitioning between states.

16. The method according to claim 15, wherein said dynamically adjusting step further comprises the step of:
dynamically adjusting said clock period by an order comprising at least one of: a clock cycle, a multiple of said clock cycle and an integer fraction of said clock cycle.

17. The method according to claim 16, further comprising the steps of:
providing a microprocessor having at least two cores;
connecting a separate local voltage power source to a respective core of said at least two cores in said microprocessor;
supplying at least two sensors, a respective sensor of said at least two sensors being coupled to a respective core of said at least two cores, said respective sensor being configured to detect a change in voltage levels in said respective core of said at least two cores when said respective core in said microprocessor is transitioning between states; and
dynamically adjusting, based on an output signal from said respective sensor supplied, said predetermined clock period of said adjustable clock source to allow a non-standard time to said respective core to complete transitioning between states, wherein an effective core frequency of said respective core is optimized, and wherein performance of said microprocessor is optimized.

18. A method for optimizing performance of a clocked digital system, said method comprising the steps of:
providing a multi-core clocked digital system having a plurality of cores, said multi-core clocked digital system being coupled to an adjustable clock source configured to supply a clock signal having a predetermined clock frequency based on a worst-case clock frequency and a predetermined clock period, said predetermined clock period being an inverse of said predetermined clock frequency;
supplying a separate local voltage power source to each respective core of said plurality of cores within said multi-core clocked digital system;
coupling a respective decoupling capacitor to said each respective core of said plurality of cores, said respective decoupling capacitor being configured to filter out sudden changes in voltage levels in said separate local voltage power source supplied to said each respective core and being configured to function as a local battery to provide power to said each respective core in said multi-core clocked digital system when necessary;

connecting at least one sensor to said each respective core, said at least one sensor being configured to detect at least one level of voltage drop caused by a state transition of said each respective core in said multi-core clocked digital system; and dynamically adjusting, based on an output signal generated by said at least one sensor connected to a respective core, a clock period of said adjustable clock source for said respective core for completing said state transition by temporarily delaying a rising edge of said clock signal to increase said predetermined clock period if said sensor output signal generated is not detected within said predetermined clock period, and wherein if said sensor output signal generated is detected within said predetermined clock period, said at least one sensor does not trigger adjustment of said predetermined clock period, wherein said effective clock frequency of said respective core remains unadjusted, and wherein performance of said clocked digital system is optimized via an adjustment in an effective frequency of said respective core.

19. The method according to claim 18, wherein said at least one sensor monitors the clock rising edge and a clock falling edge of said clock signal and triggers adjustment of said clock period at said clock falling edge to provide more time to said respective core to complete said state transition.

20. The method according to claim 19, wherein said at least one sensor is configured to determine whether or not said sensor output signal generated is detected within said predetermined clock period, wherein if said sensor output signal generated is not detected within said predetermined clock period, said at least one sensor dynamically adjusts said predetermined clock period of said clock signal to allow said respective core more time to complete said transitioning between states.

21. The method according to claim 20, wherein said effective core frequency for said respective core is calculated based on an average clock period calculated for said core using a sum of dynamically adjusted and unadjusted clock periods, said effective core frequency being faster than said worst-case clock frequency.

22. The method according to claim 21, wherein said at least one sensor comprises an embedded delay line of logic gates.

23. The method according to claim 19, wherein said at least one sensor dynamically adjusts said clock period by an order comprising at least one of: a clock cycle, a multiple of said clock cycle and an integer fraction of said clock cycle.

* * * * *